(No Model.) 3 Sheets—Sheet 1.
H. C. SMITH & W. M. BRUCE.
GRAIN SEPARATOR.
No. 351,217. Patented Oct. 19, 1886.
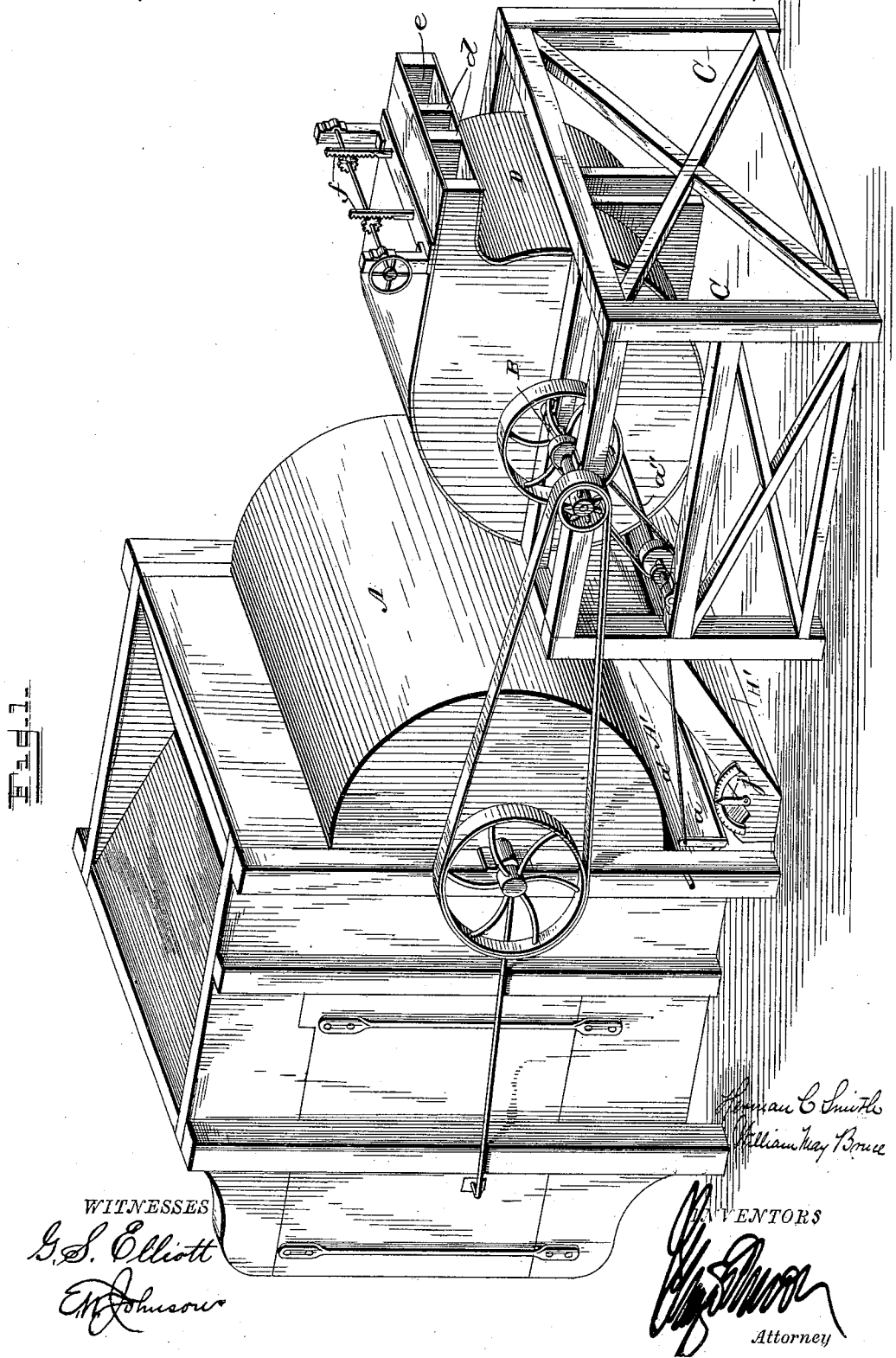

(No Model.) 3 Sheets—Sheet 2.
H. C. SMITH & W. M. BRUCE.
GRAIN SEPARATOR.
No. 351,217. Patented Oct. 19, 1886.
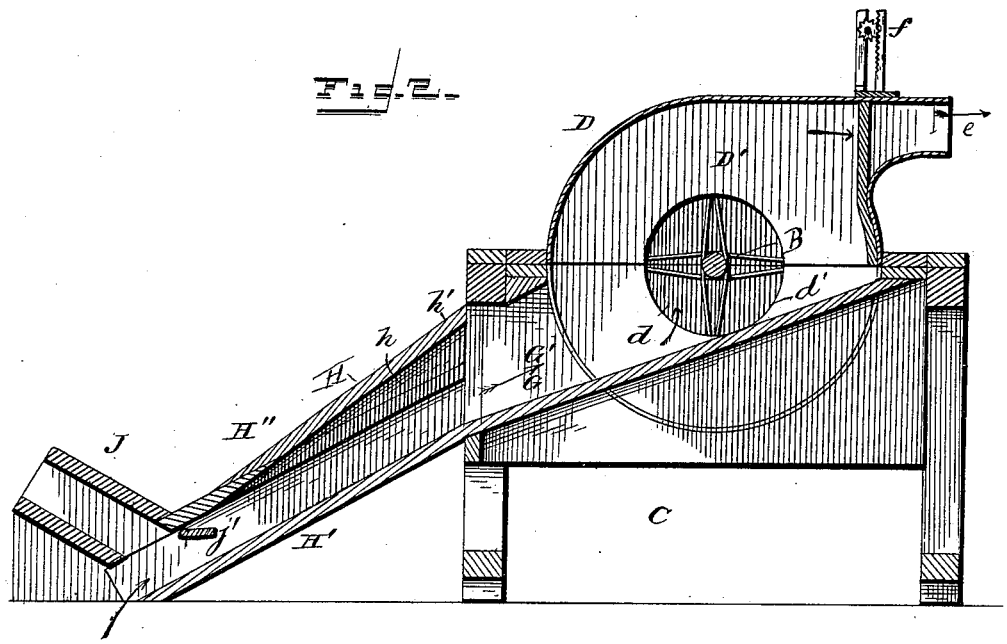
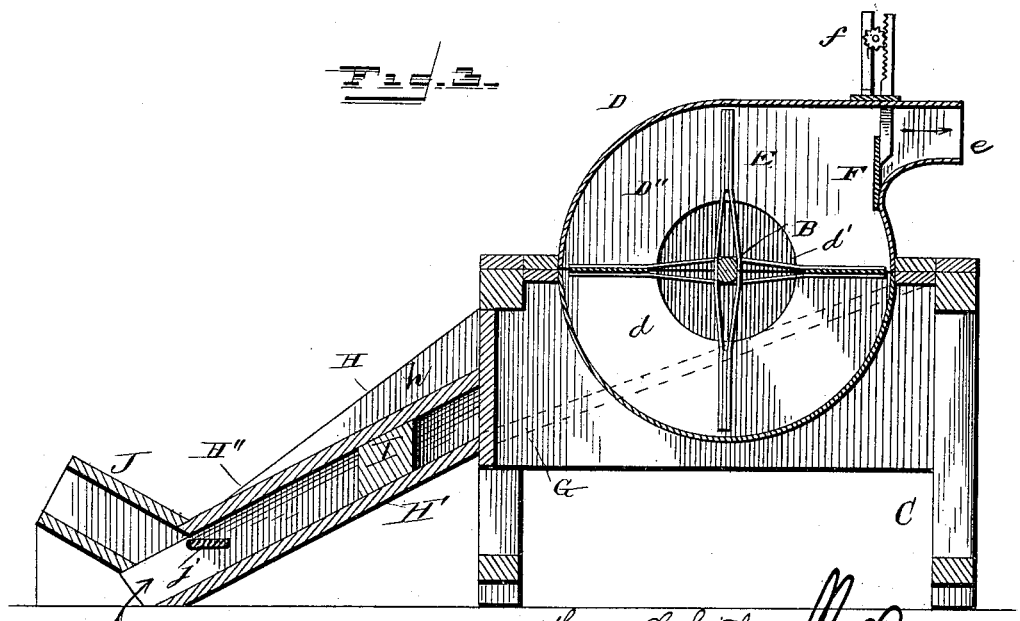

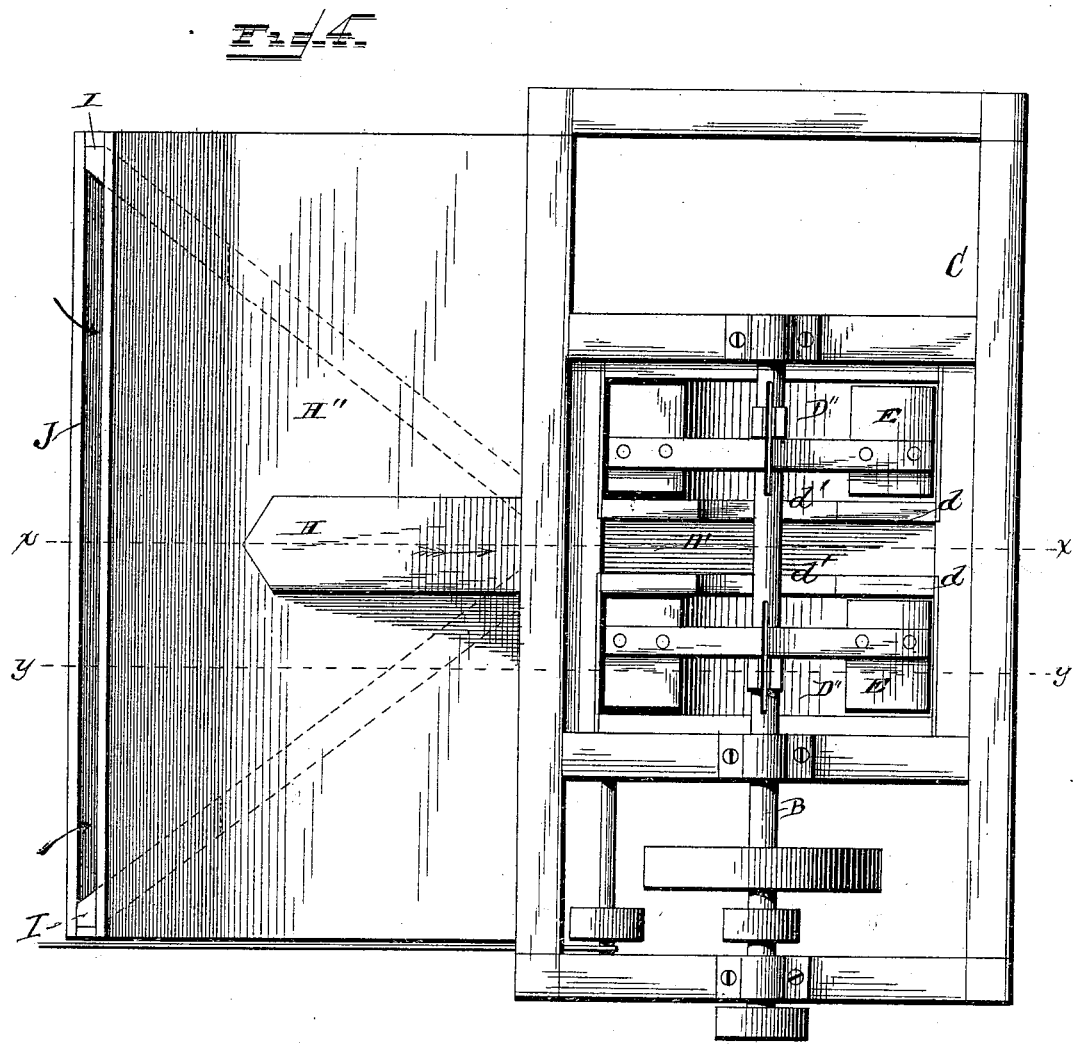

UNITED STATES PATENT OFFICE.

HERMAN C. SMITH AND WILLIAM MAY BRUCE, OF BERTRAND, NEBRASKA.

GRAIN-SEPARATOR.

SPECIFICATION forming part of Letters Patent No. 351,217, dated October 19, 1886.

Application filed March 18, 1886. Serial No. 195,744. (No model.)

*To all whom it may concern:*

Be it known that we, HERMAN C. SMITH and WILLIAM MAY BRUCE, citizens of the United States of America, residing at Bertrand, in the county of Phelps and State of Nebraska, have invented certain new and useful Improvements in Grain-Separators; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Our invention relates to certain new and useful improvements in attachments for fanning-mills or grain-separators, the object of same being to provide an attachment whereby smut or similar foreign materials may be removed from the grain after the same has been winnowed without abrasion, so as to leave the grain in a firm condition and entirely free from dirt; and to this end our invention consists in the construction and combination of the parts, which will be hereinafter fully set forth, and specifically pointed out in the claims.

In the accompanying drawings, which illustrate our invention, Figure 1 is a perspective view showing the smut-machine in position and connected to a winnowing-machine. Fig. 2 is a longitudinal vertical central section taken through the line $x\ x$ of Fig. 4. Fig. 3 is also a longitudinal vertical section taken through the line $y\ y$ of Fig. 4, and Fig. 4 is a plan view showing the fan-casing removed.

A refers to an ordinary winnowing-machine, which is provided at the terminal portion of the grain-discharge spout with a pivoted board, A', which extends transversely across the spout, said board being provided with an upwardly-projecting arm, $a$, which is connected by a rod, $a'$, to a cam located on a shaft, $a''$, which is geared to the fan-shaft of the smut-machine. The shaft B of the smut-machine is adapted to be driven by a belt which gears with the fan-shaft of the winnowing-machine.

C refers to a suitable frame, to which is secured a fan-casing, D, through which fan-casing the shaft B passes, said shaft being journaled to suitable bearings secured to the frame C. The fan-casing D is formed at its upper portion into three compartments, D' D'' D''', and within the compartments D'' D''' the fans E E are located. The partition-boards $d\ d$, between the compartments D' D'' D''', are provided with openings $d'$, which are adjacent to the fan-shaft, and through which the supply of air to the fans passes from the central compartment, D', thus creating a suction through the central compartment and forcing a blast of air through each of the discharge-openings $e$. Adjacent to the exit-openings of the fan-casing is located a vertical discharge slide or damper, F, which is provided with rack-bars $f$, which engage with pinions, which are mounted on a shaft secured to the rigid frame attached above the fan-casing, so that the damper can be adjusted vertically adjacent to the exit-openings, so as to increase or diminish the size of said exit-openings, thereby increasing or diminishing the blast.

The central compartment, D', is provided with an inclined bottom, G, which extends from the rear portion of the frame C downwardly and forwardly adjacent to the lower edges of the openings $d'$, and from thence downwardly to the opposite side of the frame, as shown in Fig. 2. Above this bottom G is an opening, G', which connects with the compartment D' between the fans.

To the frame C is rigidly attached an extension, H, which inclines downwardly, and the upper board of this downwardly-extending portion is cut away centrally, and provided above said cut-away portion with side pieces, $h\ h$, to which is attached a top, $h'$, so as to provide at the central portion a vertically-enlarged entrance space to the passage G', which leads to the compartment D'. The bottom board, H', is substantially a continuation of the board G, though it extends entirely across the smut-machine. Between the bottom board, H', of the inclined extension and the upper board, H'', are placed bars I, which extend from the side pieces upwardly, converging toward each other adjacent to the extension H, so that in effect the suction-passage converges horizontally and expands vertically from its entrance to the fans.

J refers to an upwardly-inclined spout or entrance-passage, which is rigidly attached to the lower end of the extension H, and into this spout the grain, as it falls from the vibrating board A', is fed. A damper, j, with an arm, j', attached to its shaft, is located at the base of this entrance-spout J, and the arm j' thereof engages with a suitable securing means for holding the damper in position, which securing means may also be provided with gage-marks for indicating the position of the damper.

The operation of our invention is as follows: When the fans are rotated at a high speed, a suction-current is formed, which causes the air to enter the air-passage through the lower opening, as indicated by the arrow in Fig. 2, thus causing an upward current therein, which passes through the openings d', and from thence out through the openings e e. The grain, after it is winnowed, is delivered from the vibrating board A' into the entrance or feed-opening J, and falls into the lower portion of the air-passage. The smut which may be on the grain is then caught and carried upwardly by the air-current, while the grain falls into a suitable receptacle placed under the inclined way.

By the use of the air-separator or smut-machine, as hereinbefore described, the smut is thoroughly removed from the grain without abrasion or by the use of brushes, and the grain is delivered to the receptacle in a clean condition.

We claim—

1. In a grain-separator for removing smut from grain, the combination of the suction-fans, the downwardly-inclined receiving-spout, the upwardly-inclined suction-passage converging horizontally and expanding vertically from its receiving end, and the compartment between the fans, substantially as and for the purpose set forth.

2. In a grain-separator, a fan-casing having side compartments, D'', a central suction-compartment, D', fans located within the side compartments, a converging air-passage communicating with the center compartment, and a blast-regulator, substantially as set forth.

3. In a grain separator, the combination of the fans, a fan-casing mounted on a suitable frame and divided into compartments D' D'' D'', communicating by openings d' d', and an inclined air-passage connecting with the central compartment, D', and formed with the upward extension H, substantially as and for the purpose set forth.

4. In combination with a winnowing-machine and a vibrating delivery-board, A', an air-separator comprising a supporting-frame, a fan-casing, D, divided into three communicating compartments, fans located within the side compartments, a converging upwardly-inclined air-passage communicating with the central compartment, and a receiving-spout, J, substantially as set forth.

In testimony whereof we affix our signatures in presence of two witnesses.

HERMAN C. SMITH.
WILLIAM MAY BRUCE.

Witnesses:
W. E. CHAPMAN,
WILLIAM S. ARCHER.